United States Patent Office 2,891,619
Patented June 23, 1959

2,891,619
POLYMERIC GELLING AGENTS FOR ACID-SAND MIXTURES

Loy D. Sneary, Bartlesville, Okla., assignor to Phillips Petroleum Company, a corporation of Delaware No Drawing. Application December 28, 1956
Serial No. 631,030

10 Claims. (Cl. 166—42)

This invention relates to polymeric gelling agents for acid-sand mixtures. In a further aspect, this invention relates to a new method of treating earth formations penetrated by a well bore which comprises injecting into said well bore an acid-sand mixture containing a polymeric gelling agent.

In many cases, oil and gas wells fail to produce satisfactorily even though the well reservoir is far from exhausted. This often is the result of plugging of flow chambers in the producing formation preventing flow from one chamber into adjacent parts of the formation. For many years, one solution for this difficulty has been to treat said wells with acid, said treatment serving to dissolve formations within the reservoir and to increase production. The next development was to fracture the formation by injecting a fluid under sufficient pressure to open up new chambers within the formation.

While these methods have resulted in considerable increased production, a method has now been developed which combines the two operations. In order to maintain open chambers produced by said fracturing, sand is introduced with the acid and, upon removal of the acid, the sand remains in the formation serving to prop open the fractures preventing their closing when the pressure is reduced. In order for the sand to be carried by the acid solution, various gelling or viscosity increasing agents have been employed.

This invention relates to a new class of gelling agents, these being copolymers of conjugated dienes and copolymerizable heterocyclic nitrogen bases, as exemplified by copolymers of 1,3-butadiene and 2-methyl-5-vinylpyridine. These gelling agents have the advantage of providing said sand treatment while using a very small amount of the gelling agent. Furthermore, they provide fracturing liquids which show small variation in viscosity over the temperature range encountered in their use.

The following are objects of this invention.

An object of this invention is to improve production of oil and gas from existing wells. A further object of this invention is to provide new gelling agents for acid-sand mixtures. A further object of this invention is to provide a new method of treating oil and gas wells to increase the production thereof.

Other objects and advantages of this invention will be apparent to one skilled in the art upon reading this disclosure.

I have discovered, as stated, that copolymers of conjugated dienes containing up to eight carbon atoms and copolymerizable heterocyclic nitrogen bases are excellent gelling agents for acid-sand mixtures. In order to provide proper gelling without the use of excessive amounts of the polymer, the amounts of monomers polymerized should be maintained within a fairly narrow range. More specifically, based upon one hundred parts of monomers, from seventy-five to fifty parts of the polymerizable heterocyclic nitrogen base should be used with from twenty-five to fifty parts by weight of the conjugated diene.

The particular method of preparing these polymers does not constitute a feature of my invention. Representative processes which are suitable are discussed in an article appearing in Industrial and Engineering Chemistry, 47, 863 (April 1955).

The conjugated dienes employed are those containing from four to eight carbon atoms per molecule and include 1,3-butadiene, isoprene, 2-methyl-1,3-butadiene, 2,3-dimethyl-1,3-butadiene, and the like. Various alkoxy, such as methoxy and ethoxy and cyano derivatives of these conjugated dienes, are also applicable. Thus, other dienes, such as 2,3-dimethyl-1,3-hexadiene, 2-methoxy-3-ethylbutadiene, 2-methoxy-3-ethyl-1,3-pentadiene, 2-cyano-1,3-butadiene, are also applicable in the preparation of the polymeric binders of this invention.

Instead of using a single conjugated diene, a mixture of conjugated dienes can be employed. Thus, a mixture of 1,3-butadiene and isoprene can be employed as the conjugated diene portion of the monomer system.

The polymerizable heterocyclic nitrogen bases which are applicable for the production of the gelling agents are those of the pyridine, quinoline, and isoquinoline series which are copolymerizable with a conjugated diene and contain one, and only one,

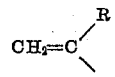

substituent where R is either hydrogen or a methyl group. That is, the substituent is either a vinyl or an alpha-methylvinyl group. Of these, the compounds of the pyridine series are of the greatest interest commercially at present. Various substituted derivatives are applicable but the total number of carbon atoms in the groups attached to the carbon atoms of the heterocyclic nucleus in addition to vinyl or alpha-methylvinyl group should not be greater than twelve because the polymerization rate decreases somewhat with increasing size of the alkyl group. Compounds where the alkyl substituents are methyl and/or ethyl are available commercially. These heterocyclic nitrogen bases have the formula

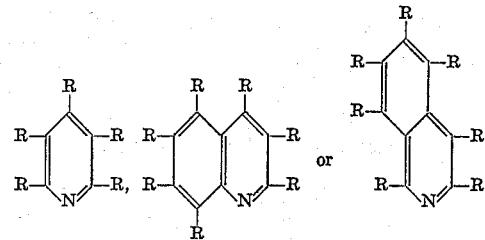

where R is selected from the group consisting of hydrogen, alkyl, vinyl, alpha-methylvinyl, alkoxy, halo, hydroxy, cyano, aryloxy, aryl, and combinations of these groups such as haloalkyl, alkylaryl, hydroxy, aryl, and the like; one and only one of said groups being selected from the group consisting of vinyl and alpha-methylvinyl; and the total number of carbon atoms in the nuclear substituted groups, in addition to the vinyl or alpha-methylvinyl group, being not greater than twelve. Examples of such compounds are 2-vinylpyridine; 2-vinyl-5-ethylpyridine; 2-methyl-5-vinylpyridine; 4-vinylpyridine; 2,3,4-trimethyl-5-vinylpyridine; 3,4,5,6-tetra-methyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl - 3-vinylpyridine; 2,3-dimethyl-5,6-dipentyl-3-vinylpyridine; 2-decyl-5-(alpha-methylvinyl)pyridine; 2-vinyl-3-methyl-5-ethylpyridine; 2-methoxy-4-chloro-6-vinylpyridine; 3-vinyl-5-ethoxypyridine; 2-vinyl-4,5-dichloropyridine; 2-(alpha-methylvinyl)-4-hydroxy-6-cyanopyridine; 2-vinyl-4-phenoxy-5-methylpyridine; 2-cyano-5-(alpha-methylvinyl)pyridine; 3-vinyl-5-phenylpyridine; 2-(para-methylphenyl)-3-vinyl-4-methylpyridine; 3-vinyl - 5 - (hydroxyphenyl)-pyridine; 2-vinylquinoline; 2-vinyl-4-ethylquinoline; 3-vinyl-6,7-di-n-propylquinoline; 2-methyl-4-nonyl-6-vinylquinoline; 4-(alpha-methylvinyl)-8-dodecylquinoline; 3-vinylisoquinoline; 1,6-dimethyl-3-vinylisoquinoline; 2-vinyl-4-benzylquinoline; 3-vinyl-5-chloroethylquinoline; 3-vinyl-5,6-dichloroisoquinoline; 2-vinyl-6-ethoxy-7-methylquinoline; 3-vinyl-6-hydroxy-8-methylisoquinoline; and the like. Mixtures of these heterocyclic nitrogen bases can be used, if desired.

The use of this process of increasing the production of oil and gas wells is far from a science and the many variables encountered make difficult the provision for exact limits. However, considerable experimental work has been done in the field. Broadly, the process comprises pumping a viscous gel containing sand into the base formation until the pressure developed is great enough to cause the formation to break down forming a number of fractures extending from the well bore and extending into the body of the formation. Hydrochloric acid is the acid on which the greatest amount of work has been done and this acid is generally used to provide a weight percent concentration of approximately fifteen percent acid in the water. This solution is easily prepared since commercial acid can be diluted with approximately an equal amount of water to produce the fracturing fluid. However, with hydrochloric acid, as well as the acids subsequently disclosed, a range of about 5 to 25 weight percent acid can be used. Additional acids which have been used include hydrofluoric, sulfuric, phosphoric, acetic, chloroacetic, trichloroacetic, formic, lactic, and benzoic. Mixtures of acids can be used. The particular acid composition selected depends to at least a limited extent upon the type of formation being treated. For example, hydrochloric is most suitable where the formation is primarily limestone or dolomite. Hydrofluoric is preferred where silicates or other clays are encountered. Most any kind of sand can be used in this operation although a smooth, round grain sand is preferred. A range of 10 to 80 mesh is used with a mesh size of approximately 30 being preferred. The sand is used in an amount of from 0.2 to 3 pounds per gallon of the acid gel.

In the composition of my invention, the additional components used in prior fracturing and acidizing operations can be employed. These include corrosion inhibitors of the inorganic type such as arsenious acid, arsenic acid, and their soluble salts, and the organic type such as sulfides, thioreas, amines, thiocresols, aldehydes, ketones, and aromatic sulfonates; intensifiers, such as ammonium fluoride; and retarders, such as sodium hexametaphosphate.

The amount of copolymeric gelling agent used in the fracturing liquids of my invention varies from 0.3 to 3 weight percent although, for reasons of economy, less than one percent is generally used.

In operations using the mixture of my invention, the complete mixture can be prepared in any suitable container by adding the ingredients in any desired order. Preferred operation is obtained when the acid is added to the water and the polymer is added subsequently. Agitation is used to prepare the viscous solution. Following the preparation of the gelled acid, the sand can then be added, either in the mixing tank or supplied to the gelled acid as it is pumped into the well. The viscosity of the gelled acid varies from a few centipoises to as high as 4,000 or 5,000. Injection pressures measured at the well head vary from 500 to 5,000 pounds per square inch and the sand-laden gel is pumped into the well at rates ranging from 4 to 30 barrels per minute depending, of course, upon the particular formation involved and the number of channels available.

One particular example of a fracturing acid suitable for use by me comprises a butadiene/2-methyl-5-vinylpyridine copolymer prepared by polymerizing 25 parts by weight of butadiene and 75 parts by weight of 2-methyl-5-vinylpyridine, dissolved in aqueous hydrochloric acid containing 15 percent hydrochloric acid by weight, the polymer being added in an amount of 2 ounces per gallon or approximately one weight percent. To the mixture is added approximately one pound of sand per gallon to provide the acid fracturing mixture.

An oil well can be fractured using the above-described sand-laden acid gel by injecting into the well 3,000 gallons of the acid gel. The gel is introduced at an average injection rate of 6 barrels per minute, the injection pressure ranging from 2,000 to 3,200 pounds per square inch, the zone being treated being at a depth of 3,942 to 4,200 feet. Production can be improved by this treatment from 17 barrels of oil per day to 185 barrels of oil per day.

While I have included sand as a component of the fracturing liquid, it should be obvious that the gelled acid can be used alone, i.e., without the sand propping agent, when a viscous fracturing liquid is desired.

As many possible embodiments can be made of this invention without departing from the scope thereof, it is to be understood that all matter herein set forth is to be interpreted as illustrative and not as unduly limiting the invention.

I claim:

1. The method of treating an earth formation penetrated by a well bore which comprises introducing into the well bore under sufficient pressure to fracture the formation surrounding said bore a composition comprising an aqueous mixture containing hydrochloric acid, a polymer prepared by polymerizing per 100 parts by weight monomers, 75 to 50 parts of 2-methyl-5-vinylpyridine and 25 to 50 parts of 1,3-butadiene, and sand; and removing liquid components of said composition, said removal leaving said sand in fractures as a prop.

2. The method of treating an earth formation penetrated by a well bore which comprises introducing into the well bore, under sufficient pressure to fracture the formation surrounding said bore, a composition comprising an aqueous mixture containing hydrochloric acid, a polymer prepared by polymerizing, per 100 parts by weight of monomers, 75 to 50 parts of a compound selected from the group consisting of

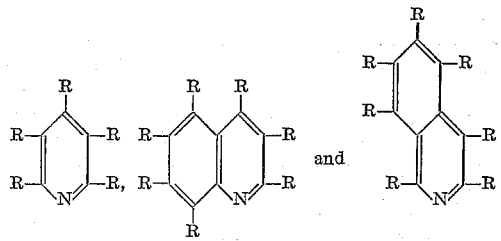

where R is selected from the group consisting of hydrogen, alkyl, vinyl, alphamethylvinyl, alkoxy, halo, hydroxy, cyano, aryloxy, aryl, and combinations of these groups, one and only one of said R groups being selected from the group consisting of vinyl and alpha-methylvinyl, said vinyl or alpha-methylvinyl group being present on said nitrogen containing ring, and 25 to 50 parts of a conjugated diene containing not over eight carbon atoms, and sand; and removing liquid components of said composition, said removal leaving said sand in fractures as a prop.

3. The method of treating an earth formation penetrated by a well bore which comprises introducing into the well bore under sufficient pressure to fracture the formation surrounding said bore a composition comprising aqueous acid, said aqueous acid containing 5 to 25 percent by weight of a water soluble acid; from 0.2 to 3 pounds of 10 to 80 mesh, smooth, round grain sand per gallon of aqueous acid; and 0.3 to 3 percent by weight based on said aqueous acid of a copolymer prepared by polymerizing, per 100 parts of monomers by weight, 75 to 50 parts of 2-methyl-5-vinylpyridine and 25 to 50 parts of 1,3-butadiene; and removing liquid components of said composition, said removal leaving said sand in fractures as a prop.

4. The method of claim 3 wherein said aqueous acid is hydrochloric acid.

5. A composition of matter which comprises aqueous acid, said aqueous acid containing 5 to 25 percent by weight of a water soluble acid; from 0.2 to 3 pounds of a 10 to 80 mesh, smooth round grain sand per gallon of aqueous acid; and 0.3 to 3 percent by weight based on said aqueous acid of a copolymer prepared by polymerizing, per 100 parts by weight of monomers, 75 to 50 parts of 2-methyl-5-vinylpyridine and 25 to 50 parts of 1,3-butadiene, the amount of said copolymer being sufficient to gel said aqueous acid so as to maintain said in suspension during introduction into an earth formation penetrated by a well bore.

6. A composition of matter which comprises aqueous acid, said aqueous acid containing 5 to 25 percent by weight of a water soluble acid; from 0.2 to 3 pounds of a 10 to 80 mesh, smooth round grain sand per gallon of aqueous acid; and 0.3 to 3 percent by weight based on said aqueous acid of a copolymer prepared by polymerizing per 100 parts by weight of monomers 75 to 50 parts of a compound selected from the group consisting of

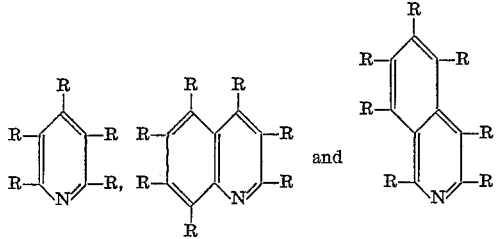

where R is selected from the group consisting of hydrogen, alkyl, vinyl, alpha-methylvinyl, alkoxy, halo, hydroxy, cyano, aryloxy, aryl, and combinations of these groups, one and only one of said R group being selected from the group consisting of vinyl and alpha-methylvinyl, said vinyl or alpha-methyl vinyl group being present on said nitrogen containing ring, and 25 to 50 parts of a conjugated diene containing not over eight carbon atoms, the amount of said copolymer being sufficient to gel said aqueous acid so as to maintain sand in suspension during introduction into an earth formation penetrated by a well bore.

7. A composition of matter which comprises aqueous hydrochloric acid, said aqueous acid containing 5 to 25 percent by weight of hydrochloric acid; from 0.2 to 3 pounds of a ten to eighth mesh, smooth, round grain sand per gallon of aqueous acid, and 0.3 to 3 percent by weight based on said aqueous acid of a copolymer prepared by polymerizing, per 100 parts by weight of monomers, 75 to 50 parts of 2-methyl-5-vinylpyridene and 25 to 50 parts of 1,3-butadiene, the amount of said copolymer being sufficient to gel said aqueous acid so as to maintain sand in suspension during introduction into an earth formation penetrated by a well bore.

8. A composition of matter which comprises an aqueous mixture containing hydrochloric acid, a polymer prepared by polymerizing, per 100 parts by weight of monomers, 75 to 50 parts by weight of 2-methyl-5-vinylpyridine and 25 to 50 parts of 1,3-butadiene, and sand, the amount of said copolymer being sufficient to gel said aqueous mixture containing hydrochloric acid so as to maintain sand in suspension during introduction into an earth formation penetrated by a well bore.

9. The method of treating an earth formation penetrated by a well bore which comprises introducing into the well bore under sufficient pressure to fracture the formation surrounding said well bore a composition comprising aqueous acid, said aqueous acid containing 5 to 25 percent by weight of a water soluble acid and a polymer prepared by polymerizing, per 100 parts by weight of monomers, 75 to 50 parts of a compound selected from the group consisting of

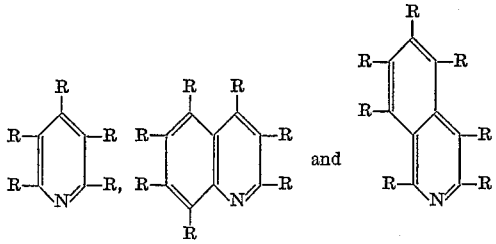

where R is selected from the group consisting of hydrogen, alkyl, vinyl, alpha-methylvinyl, alkoxy, halo, hydroxy, cyano, aryloxy, aryl, and combinations of these groups, one and only one of said R groups being selected from the group consisting of vinyl and alpha-methylvinyl, said vinyl or alpha-methylvinyl group being present on said nitrogen containing ring, and 25 to 50 parts of a conjugated diene containing not over eight carbon atoms; and removing said composition.

10. A composition of matter which comprises an aqueous mixture containing a water soluble acid, sand, and a copolymer prepared by polymerizing per 100 parts by weight of monomers 75 to 50 parts of a compound selected from the group consisting of

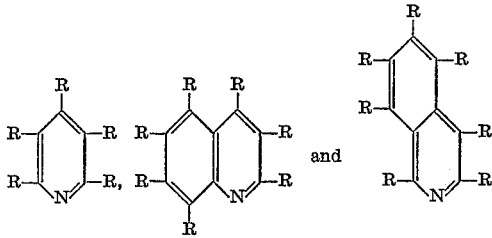

where R is selected from the group consisting of hydrogen, alkyl, vinyl, alpha-methylvinyl, alkoxy, halo, hydroxy, cyano, aryloxy, aryl, and combinations of these groups, one and only one of said R group being selected from the group consisting of vinyl and alpha-methylvinyl, said vinyl or alpha-methylvinyl group being present on said nitrogen containing ring, and 25 to 50 parts of a conjugated diene containing not over eight carbon atoms, the amount of said copolymer being sufficient to gel said aqueous acid so as to maintain sand in suspension during introduction into an earth formation penetrated by a well bore.

References Cited in the file of this patent
UNITED STATES PATENTS

| 2,619,445 | Kalafus | Nov. 25, 1952 |
| 2,751,348 | Brainerd | June 19, 1956 |
| 2,773,795 | Reynolds | Dec. 11, 1956 |